(12) United States Patent
Sikka et al.

(10) Patent No.: US 12,515,163 B2
(45) Date of Patent: Jan. 6, 2026

(54) TECHNIQUES FOR LOW-POWER, LARGE-SCALE DIRECT AIR CARBON CAPTURE VIA WIND TURBINE

(71) Applicants: Varin Sikka, Los Altos Hills, CA (US); Vishal Inder Sikka, Los Altos Hills, CA (US)

(72) Inventors: Varin Sikka, Los Altos Hills, CA (US); Vishal Inder Sikka, Los Altos Hills, CA (US)

( * ) Notice: Subject to any disclaimer, the term of this patent is extended or adjusted under 35 U.S.C. 154(b) by 347 days.

(21) Appl. No.: 18/355,365

(22) Filed: Jul. 19, 2023

(65) Prior Publication Data
US 2024/0024810 A1  Jan. 25, 2024

Related U.S. Application Data

(60) Provisional application No. 63/392,084, filed on Jul. 25, 2022.

(51) Int. Cl.
*B01D 53/04* (2006.01)
*B01D 53/06* (2006.01)
(Continued)

(52) U.S. Cl.
CPC ..... *B01D 53/0438* (2013.01); *B01D 53/0446* (2013.01); *B01D 53/06* (2013.01);
(Continued)

(58) Field of Classification Search
CPC ............ B01D 53/0438; B01D 53/0446; B01D 53/04; B01D 53/06; B01D 2253/20;
(Continued)

(56) References Cited

U.S. PATENT DOCUMENTS 6,547,854 B1  4/2003  Gray et al.
7,992,409 B1*  8/2011  Cooper ............... B01D 53/002
                                                          95/228
(Continued)

FOREIGN PATENT DOCUMENTS

CN       106938165 A    7/2017
GB       2 542 334 A    3/2017
(Continued)

OTHER PUBLICATIONS

International Search Report for Application No. PCT/US2023/070610 dated Nov. 17, 2023.
(Continued)

*Primary Examiner* — Frank M Lawrence, Jr.
(74) *Attorney, Agent, or Firm* — Artegis Law Group, LLP

(57) ABSTRACT

According to various embodiments, a direct air capture system includes: a wind turbine that includes at least one blade that includes one or more openings, wherein, in operation, first air flows across the at least one blade, causing the wind turbine to generate electrical energy, and causing the one or more openings to receive second air; a conduit that fluidly couples the one or more openings to a carbon dioxide ($CO_2$) adsorption chamber that includes one or more amine-based $CO_2$ adsorbers, wherein, in operation, the $CO_2$ adsorption chamber receives the second air via the one or more openings; and a carbon desorption apparatus that desorbs $CO_2$ from the one or more amine-based $CO_2$ adsorbers.

20 Claims, 5 Drawing Sheets

(51) Int. Cl.
B01D 53/96 (2006.01)
F03D 9/25 (2016.01)
F03D 80/80 (2016.01)

(52) U.S. Cl.
CPC ............. F03D 9/25 (2016.05); F03D 80/881 (2023.08); *B01D 2253/20* (2013.01); *B01D 2257/504* (2013.01); *B01D 2258/06* (2013.01); *B01D 2259/4009* (2013.01); *B01D 2259/40096* (2013.01); *F05B 2220/70* (2013.01)

(58) Field of Classification Search
CPC .......... B01D 2257/504; B01D 2258/06; B01D 2259/4009; B01D 2259/40096; F03D 9/25; F03D 80/881; F03D 80/00; F05B 2220/70; Y02C 20/40
USPC .... 95/107, 139; 96/108, 121, 125, 126, 146; 423/230
See application file for complete search history.

(56) References Cited

U.S. PATENT DOCUMENTS

| | | | |
|---|---|---|---|
| 8,715,393 | B2 | 5/2014 | Wright et al. |
| 9,382,165 | B1 | 7/2016 | Vanderhye |
| 2015/0211489 | A1 | 7/2015 | Dakhil |
| 2021/0187439 | A1 | 6/2021 | Canuto |
| 2022/0241727 | A1* | 8/2022 | Dehlsen .................. B63B 43/06 |
| 2023/0173428 | A1* | 6/2023 | Sikka ........................ F03D 9/22 95/113 |
| 2025/0198258 | A1* | 6/2025 | Vitucci ................... E21B 43/01 |

FOREIGN PATENT DOCUMENTS

| | | | | |
|---|---|---|---|---|
| WO | WO-2008041920 | A1 * | 4/2008 | .............. F03D 9/25 |
| WO | 2010/091831 | A1 | 8/2010 | |

OTHER PUBLICATIONS

Yassin et al., "Effects of the Heating Source on the Regeneration Performance of Different Adsorbents under Post-Combustion Carbon Capture Cyclic Operations. A Comparative Analysis", Separation and Purification Technology, https://doi.org/10.1016/j.seppur.2021.119326, vol. 276, 2021, pp. 1-15.

Ribeiro et al., "Electric Swing Adsorption for Gas Separation and Purification: A Review", Separation Science and Technology, DOI: 10.1080/01496395.2014.915854, vol. 49, No. 13, 2014, pp. 1985-2002.

Hamdy et al., "The Application of Amine-Based Materials for Carbon Capture and Utilisation: An Overarching View", Materials Advances, DOI: 10.1039/d1ma00360g, vol. 2, No. 18, Aug. 18, 2021, pp. 5843-5880.

Goldberg, David, "MITAB2021 Keynote ID 168 David Goldberg", Retrieved from https://www.youtube.com/watch?v=lElyAulMtxc, Aug. 26, 2021, 2 pages.

Goldberg et al., "Opportunities for Offshore Wind Energy and Large-Scale Sequestration of CO2 In Basalt Rocks: The Kerguelen Island Case", Applied Energy Symposium, Aug. 11-13, 2021, pp. 1-10.

Crisanto et al., "Design and Simulation of a Small-Scale, Power-Generating Device by Carbon Sequestration", 13th International Conference on Humanoid, Nanotechnology, Information Technology, Communication and Control, Environment, And Management, DOI: 10.1109/HNICEM54116.2021.9732004, 2021, 6 pages.

* cited by examiner

TECHNIQUES FOR LOW-POWER, LARGE-SCALE DIRECT AIR CARBON CAPTURE VIA WIND TURBINE

CROSS-REFERENCE TO RELATED APPLICATIONS

This application claims priority benefit of the United States Provisional Patent Application titled, "TECHNIQUES FOR LOW-POWER, LARGE SCALE DIRECT AIR CAPTURE VIA WIND TURBINES" filed on Jul. 25, 2022 and having Ser. No. 63/392,084. The subject matter of this related application is hereby incorporated herein by reference.

BACKGROUND

Field of the Various Embodiments

The various embodiments relate generally to carbon capture technology and, more specifically, to a low-power direct air carbon capture system.

Description of the Related Art

According to many scientific studies, global warming is becoming a serious problem for both current and future generations. Many argue that a primary contributor to global warming is the human expansion of the "greenhouse effect," in which the Earth's atmosphere traps heat that would otherwise radiate from the Earth into space. The different gases contributing to the greenhouse effect (referred to herein as "greenhouse gases") include water vapor, methane, nitrous oxide, and carbon dioxide. Many scientists believe that the most serious effects of global warming can be prevented by reducing human-based emissions of greenhouse gases and lowering the concentration of greenhouse gases currently in the Earth's atmosphere. To that end, one technology being developed to address global warming is direct air carbon capture, where carbon dioxide is captured and removed from the Earth's atmosphere.

Direct air carbon capture typically involves attempts to remove large quantities of carbon dioxide from the Earth's atmosphere by an adsorption/desorption process. In many direct air carbon capture implementations, ambient air is exposed to a suitable sorbent, such as an amine-based material, which adsorbs the carbon dioxide present in the ambient air. The adsorbed carbon dioxide is then released from the sorbent via a desorption process for subsequent storage.

For direct air carbon capture or any other process to be a viable approach for reducing the greenhouse effect, the process of removing carbon dioxide from the Earth's atmosphere needs to result in negative greenhouse gas emissions. That is, the amount of greenhouse gas produced when generating the energy necessary to affect the direct air carbon capture process has to be less than the amount of greenhouse gas the direct air carbon capture process removes from the Earth's atmosphere.

One drawback to conventional direct air carbon capture processes is that those processes typically require significant energy, including the thermal energy needed for freeing carbon dioxide in the desorption process and, oftentimes, the fan energy needed for directing ambient air onto the sorbent material. Accordingly, in order to achieve a negative greenhouse gas emission process, direct air carbon capture facilities are typically located at or near large sources of renewable energy, such as the site of a geothermal reservoir, a solar power plant, or a wind farm. Such location constraints prevent conventional direct air carbon capture processes from being broadly implemented, which limits the effectiveness of direct air carbon capture in combating global warming. In addition, direct air carbon capture facilities are normally quite large, having the footprint on the order of a commercial building, which limits where these facilities can be built as well as the number of these facilities that can be built.

As the foregoing illustrates, what is needed in the art are more effective techniques for direct air carbon capture.

SUMMARY

According to various embodiments, a direct air carbon capture system includes: a wind turbine that includes at least one blade that includes one or more openings, wherein, in operation, first air flows across the at least one blade, causing the wind turbine to generate electrical energy, and causing the one or more openings to receive second air; a conduit that fluidly couples the one or more openings to a carbon dioxide ($CO_2$) adsorption chamber that includes one or more amine-based $CO_2$ adsorbers, wherein, in operation, the $CO_2$ adsorption chamber receives the second air via the one or more openings; and a carbon desorption apparatus that desorbs $CO_2$ from the one or more amine-based $CO_2$ adsorbers.

At least one technical advantage of the disclosed design relative to the prior art is that the disclosed design enables direct air carbon capture that does not require an external energy source or a large, centralized source of renewable energy. In addition, the disclosed design enables a direct air carbon capture process that does not rely on a significant quantity of fan energy. Thus, the direct air carbon capture process requires less total energy expenditure relative to prior art designs and techniques and can be greenhouse gas net-negative. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

$CO_2$ Adsorption External to Turbine Blade

Figure 1:
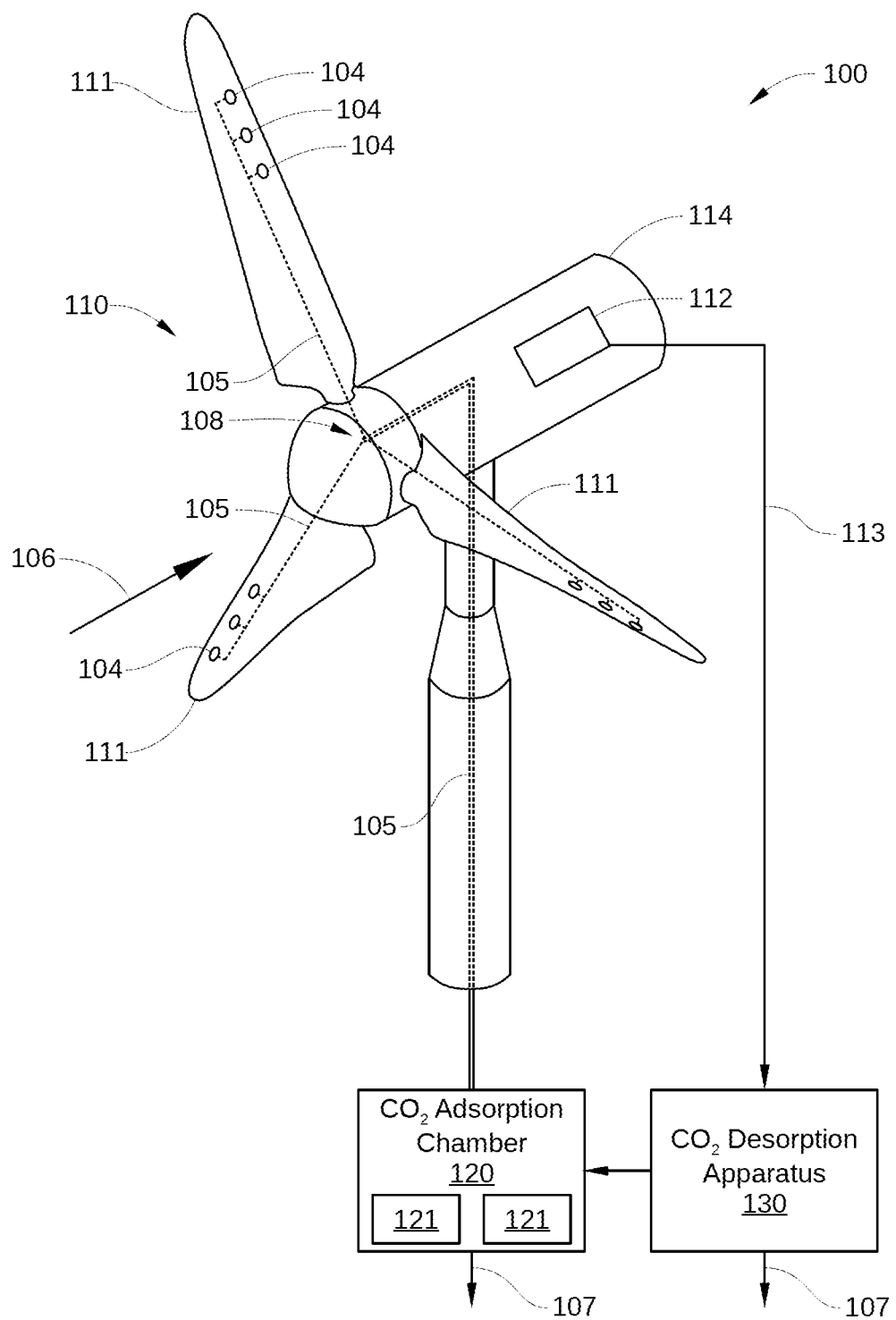
FIG. 1 is a conceptual illustration of a direct air carbon capture system configured to implement one or more aspects of the various embodiments.

FIG. 1 is a conceptual illustration of a direct air carbon capture system 100 configured to implement one or more aspects of the various embodiments. Direct air carbon capture system 100 removes carbon dioxide ($CO_2$) from ambient air via a direct-air carbon-capture process that is powered using electrical energy 113 generated by a wind turbine 110. In some embodiments, little or no fan energy is expended as part of the direct air carbon capture process, thereby increasing the total negative greenhouse gas emissions of the process. As shown, direct air carbon capture system 100 includes a wind turbine 110 with one or more blades 111 and a generator 112. Generator 112 generates electrical energy 113 when ambient air 106 flows across blades 111 and blades 111 rotate. In the embodiment illustrated in FIG. 1, one or more openings 104 are formed in a surface of each turbine blade 111 for receiving $CO_2$-containing air when wind 101 flows across blades 111. Direct air carbon capture system 100 further includes a $CO_2$ adsorption chamber 120 and a $CO_2$ desorption apparatus 130.

In the embodiment illustrated in FIG. 1, direct air carbon capture system 100 includes one or more conduits 105 that fluidly couple the one or more openings 104 to $CO_2$ adsorption chamber 120. In some embodiments, the one or more conduits 105 may include a rotary manifold 108 that fluidly connects a stationary conduit 105, for example within a nacelle 114 of wind turbine 110, to one or more conduits 105 that rotate about nacelle 114, such as the conduits 105 disposed within each blade 111. In such embodiments, rotary manifold 108 provides a rotatable connection between nacelle 114 and blades 111, thus enabling the flow of air received via openings 104 from blades 111 to $CO_2$ adsorption chamber 120.

Wind turbine 110 includes one or more blades 111, such as airfoil blades, and generates electrical energy 113 from a flow of ambient air 106 across the one or more blades 111. Wind turbine 110 can be any technically feasible wind turbine configuration, such as a horizontal axis wind turbine (HAWT) or vertical axis wind turbine (VAWT). For example, in embodiments in which wind turbine 110 is a HAWT, the blades are airfoils that are fitted to a horizontally-oriented rotor that is coupled to generator 112. A HAWT enables the positioning of the blades and rotors relatively high off the ground, so that higher and more consistent operational wind speed is received. Consequently, HAWTs are commonly employed in large-scale wind farms. In embodiments in which wind turbine 110 has a VAWT configuration, the rotational axis of the turbine is perpendicular to the ground. Unlike a HAWT, a VAWT can be powered by wind coming from any direction, and therefore has the ability to produce energy efficiently in inconsistent and/or variable wind conditions. Consequently, VAWTs are ideal for installations where wind conditions are not consistent or where the turbine cannot be placed high enough to benefit from steady wind, such as small wind projects and residential applications.

$CO_2$ adsorption chamber 120 is configured to remove $CO_2$ from ambient air via an adsorption process and to release the adsorbed $CO_2$ for sequestration and/or storage via a desorption process. To that end, $CO_2$ adsorption chamber 120 includes one or more amine-based $CO_2$ adsorbers 121. In operation, $CO_2$ adsorption chamber 120 receives a flow of ambient air via conduit 105, and $CO_2$ present in the ambient air is adsorbed to surfaces of amine-based $CO_2$ adsorbers 121. The adsorbed $CO_2$ is then released from amine-based $CO_2$ adsorbers 121 during a desorption process. In some embodiments, the desorption process is performed by heating amine-based $CO_2$ adsorbers 121, for example via steam generated by $CO_2$ desorption apparatus 130 and/or another heating method. In some embodiments, the desorption process is performed by $CO_2$ desorption apparatus 130.

Amine-based $CO_2$ adsorbers 121 include a porous amine-based material that has a high $CO_2$ adsorption capacity. In some embodiments, the amine-based material can be further selected to have a low regeneration energy, good cycle performance, and high moisture resistance. The porous amine-based material included in amine-based $CO_2$ adsorbers 121 may include a high density of micropores, so that amine-based $CO_2$ adsorbers 121 have a high specific surface area. In some embodiments, the amine-based material included in amine-based $CO_2$ adsorbers 121 are selected so that $CO_2$ adsorption is carried out at ambient temperature and regeneration of the materials during the desorption process is performed at 80-120° C. to release $CO_2$.

$CO_2$ desorption apparatus 130 is fluidly and/or thermally coupled to $CO_2$ adsorption chamber 120 and desorbs $CO_2$ from amine-based $CO_2$ adsorbers 121. In some embodiments, $CO_2$ desorption apparatus 130 desorbs $CO_2$ from amine-based $CO_2$ adsorbers 121 by generating steam and directing the steam onto amine-based $CO_2$ adsorbers 121. In such embodiments, the steam is generated using electrical energy 113 generated by wind turbine 110 and water, for example from a water reservoir (not shown). In some embodiments, during the desorption process, $CO_2$ desorption apparatus 130 is fluidly coupled to $CO_2$ adsorption chamber 120 for the provision of steam onto amine-based $CO_2$ adsorbers 121. In some embodiments, the released $CO_2$ is dissolved into condensed steam (liquid water) that forms on surfaces of amine-based $CO_2$ adsorbers 121, and the $CO_2$-containing liquid water is returned to the water reservoir. Alternatively or additionally, in some embodiments, released gas-phase $CO_2$ is flushed into the water reservoir by the steam generated by $CO_2$ desorption apparatus 130 and introduced into $CO_2$ adsorption chamber 120. In either case, during the desorption process, $CO_2$ disposed within amine-based $CO_2$ adsorbers 121 can be transported to the water reservoir for subsequent separation and/or storage. Alternatively, in some embodiments, $CO_2$ desorption apparatus 130 desorbs $CO_2$ from amine-based $CO_2$ adsorbers 121 by heating amine-based $CO_2$ adsorbers 121 directly, for example via resistance heaters (not shown) powered by electrical energy 113.

In some embodiments, $CO_2$ desorption apparatus 130 and/or $CO_2$ adsorption chamber 120 is fluidly coupled to an apparatus (not shown) for sequestration and/or storage of the $CO_2$ 107 removed from ambient air 106 processed by direct air carbon capture system 100. In some embodiments, gas-phase $CO_2$ is captured by direct air carbon capture system 100 and separated into carbon and oxygen. Alternatively or additionally, in some embodiments, $CO_2$-containing water is generated by direct air carbon capture system 100. In such embodiments, direct air carbon capture system 100 can be fluidly coupled to a system (not shown) for underground injection of $CO_2$-containing water, where the $CO_2$ is permanently removed from the biosphere via a mineralization process.

In operation, a portion of ambient air 106 that flows across blades 111 is received by openings 104, which are fluidly coupled to $CO_2$ adsorption chamber 120 via one or more conduits 105. Openings 104 are positioned on one or more surfaces of each blade 111 so that ambient air 106 that is incident on openings 104 is received by openings 104 and flows through conduits 105 to $CO_2$ adsorption chamber 120. To that end, in some embodiments, openings 104 are disposed on a particular portion of a surface of each blade 111 that causes such airflow. Specifically, the particular portion of the surface can be a portion of a blade surface that fluidly contacts a high-pressure region generated by blade 111 when ambient air 106 flows across blade 111. Embodiments of the locations of openings 104 are described below in conjunction with FIG. 2.

Figure 2:
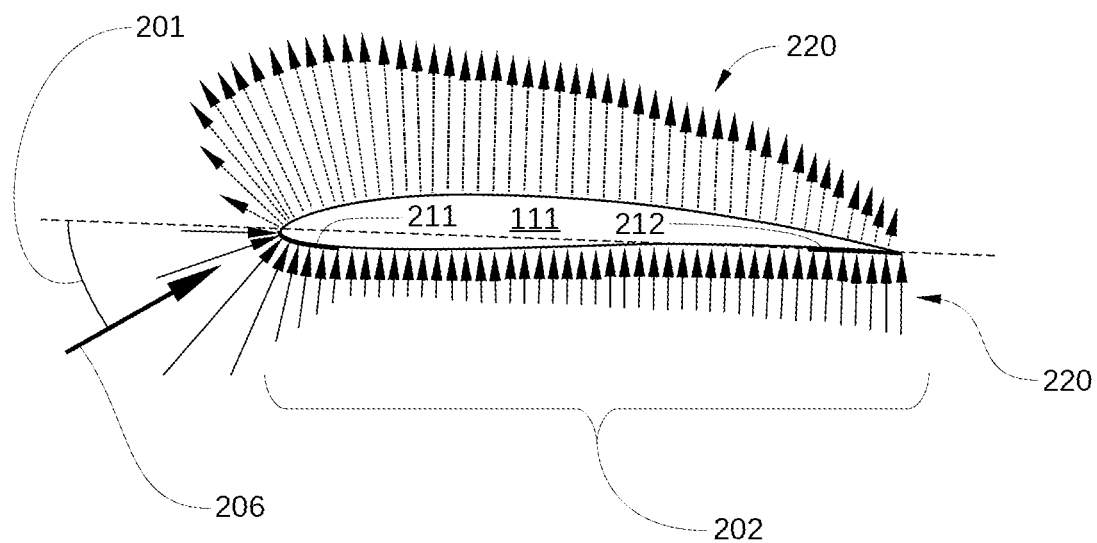
FIG. 2 schematically illustrates a cross-section of a blade of the wind turbine of FIG. 1, according to various embodiments.

FIG. 2 schematically illustrates a cross-section of a blade 111 of wind turbine 110, according to various embodiments. Generally, wind turbine 110 is oriented toward the direction of flow of ambient air 106 and blade 111 is oriented at a specific blade angle so that ambient air 106 has a relative velocity 206 that results in a suitable angle of attack 201 of blade 111, which is the angle of approach of ambient air 106 to blade 111. FIG. 2 also shows a resultant pressure distribution 220 on surfaces of blade 111 when ambient air 106 flows past blade 111 at angle of attack 201, where high pressure is indicated with solid arrows and low pressure is indicated with dashed arrows.

According to various embodiments, openings 104 (shown in FIG. 1) are disposed on one or more surfaces that fluidly contact a high-pressure region 202 generated by blade 111 when ambient air 106 flows across blade 111 at angle of attack 201. In some embodiments, one or more openings 104 are disposed on a portion of a leading edge 211 of blade 111, on a portion of a trailing edge 212 of blade 111, and/or on any other surface of blade 111 that fluidly contacts high-pressure region 202.

It is noted that angle of attack 201 is a combination of the freestream velocity of ambient air 106 and the rotational speed of blade 111. Because the blade tip (not shown) necessarily travels farther for each rotation than the blade root (not shown), the rotational speed of a cross-section of blade 111 increases from the blade root to the blade tip. Consequently, blade 111 is typically twisted from root to tip to enable an optimum or near-optimum value for angle of attack 201, and thereby improved lift generation along the length blade 111. Thus, the cross-sectional view shown in FIG. 2 illustrates the cross-section of blade 111 at a single location between the blade root and the blade tip. Therefore, the instance of resultant pressure distribution 220 shown in FIG. 2 corresponds to that single location.

Because the relative velocity between ambient air 106 and blade 111 is highest at or near the tip of blade 111, in some embodiments, openings 104 are disposed proximate the tip of blade 111. Further, in some embodiments, conduits 105 within each blade 111 have a cross-sectional area that tapers from a larger cross sectional area near the tip of blade 111 to a smaller cross-sectional areas near the root of blade 111.

$CO_2$ Adsorption within Turbine Blade

Figure 3:
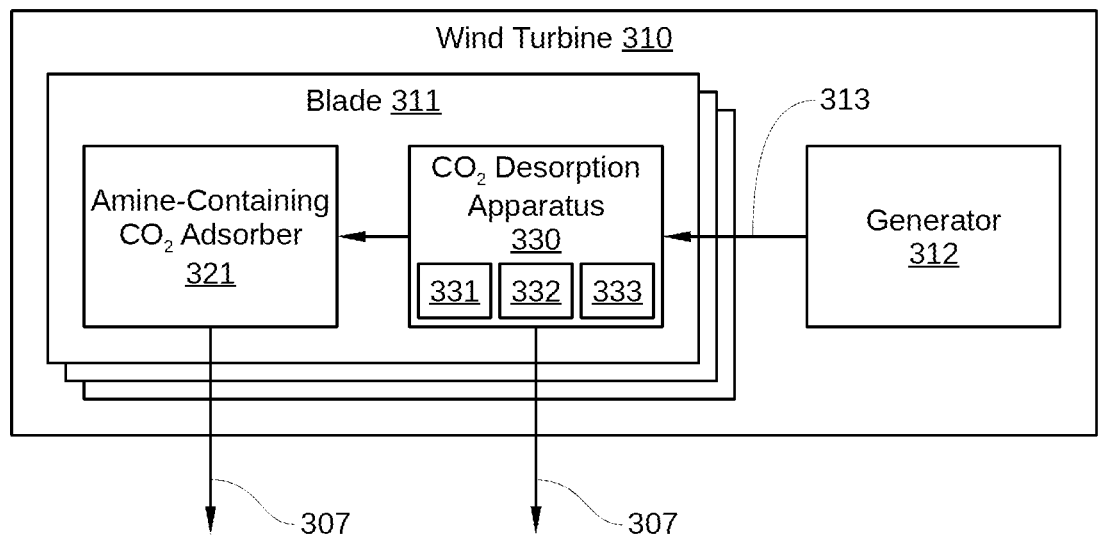
FIG. 3 is a conceptual illustration of another direct air carbon capture system configured to implement one or more other aspects of the various embodiments.

FIG. 3 is a conceptual illustration of a direct air carbon capture system 300 configured to implement one or more other aspects of the various embodiments. Similar to direct air carbon capture system 100, direct air carbon capture system 300 removes $CO_2$ from ambient air via a direct air carbon capture process that is powered using electrical energy 313 generated by a wind turbine 310. In some embodiments, little or no fan energy is expended as part of the direct air carbon capture process, thereby increasing the total negative greenhouse gas emissions of the process. As shown, direct air carbon capture system 300 includes a wind turbine 310 with one or more blades 311 and a generator 312. Generator 312 generates electrical energy 313 when ambient air 106 flows across blades 311 and blades 311 rotate. In the embodiment illustrated in FIG. 3, an amine-based $CO_2$ adsorber 321 and a $CO_2$ desorption apparatus 330 are disposed within each turbine blade 311.

Amine-based $CO_2$ adsorber 321 includes a porous amine-based material consistent with the amine-based material included in amine-based $CO_2$ adsorbers 121 of FIG. 1. Further, in the embodiment illustrated in FIG. 3, amine-based $CO_2$ adsorber 321 forms at least a portion of a surface of one or more blades 311. For example, in some embodiments, amine-based $CO_2$ adsorber 321 forms a portion of a wall of one or more blades 311.

$CO_2$ desorption apparatus 330 desorbs $CO_2$ from amine-based $CO_2$ adsorber 321. In some embodiments, $CO_2$ desorption apparatus 330 includes a steam source 331, a heat-generating element 332, and/or a vacuum-generating apparatus 333. In some embodiments, $CO_2$ desorption apparatus 330 is powered by electrical energy 313 generated by generator 312. In the embodiment illustrated in FIG. 3, at least one $CO_2$ desorption apparatus 330 is disposed within each blade 311. Steam source 331 generates steam and directs the steam onto or into amine-based $CO_2$ adsorber 321 as part of a desorption process. As a result, the steam heats amine-based $CO_2$ adsorber 321, so that $CO_2$ 307 is released therefrom. The released $CO_2$ 307 is then removed from amine-based $CO_2$ adsorber 321, for example via vacuum-generating apparatus 333. Alternatively or additionally, in some embodiments, as part of a desorption process, amine-based $CO_2$ adsorber 321 are heated via heat-generating element 332. In such embodiments, $CO_2$ 307 released from amine-based $CO_2$ adsorber 321 is captured by vacuum-generating apparatus 333. Vacuum-generating apparatus 333 can be a vacuum pump or other apparatus for generating negative pressure and capturing $CO_2$ 307 when released from amine-based $CO_2$ adsorber 321.

In operation, direct air carbon capture system 300 removes $CO_2$ 307 from ambient air 106 for storage or sequestration. Specifically, as ambient air 106 passes over the surface of a blade 311 that is formed by amine-based $CO_2$ adsorber 321, $CO_2$ is adsorbed by amine-based $CO_2$ adsorber 321. Subsequently, the adsorbed $CO_2$ is desorbed from amine-based $CO_2$ adsorber 321 (for example via steam source 331 and/or heat-generating element 332) and is withdrawn from blade 311 (for example via vacuum-generating apparatus 333). It is noted that fan energy is not employed to cause a continuous flow of $CO_2$-based ambient air across amine-based $CO_2$ adsorber 321.

In some embodiments, $CO_2$ desorption apparatus 330 includes a movable $CO_2$-desorption apparatus that can desorb $CO_2$ from different portions of amine-based $CO_2$ adsorber 321 as the movable $CO_2$-desorption apparatus is moved to different locations within a blade 311. One such embodiment is described below in conjunction with FIG. 4.

Figure 4:
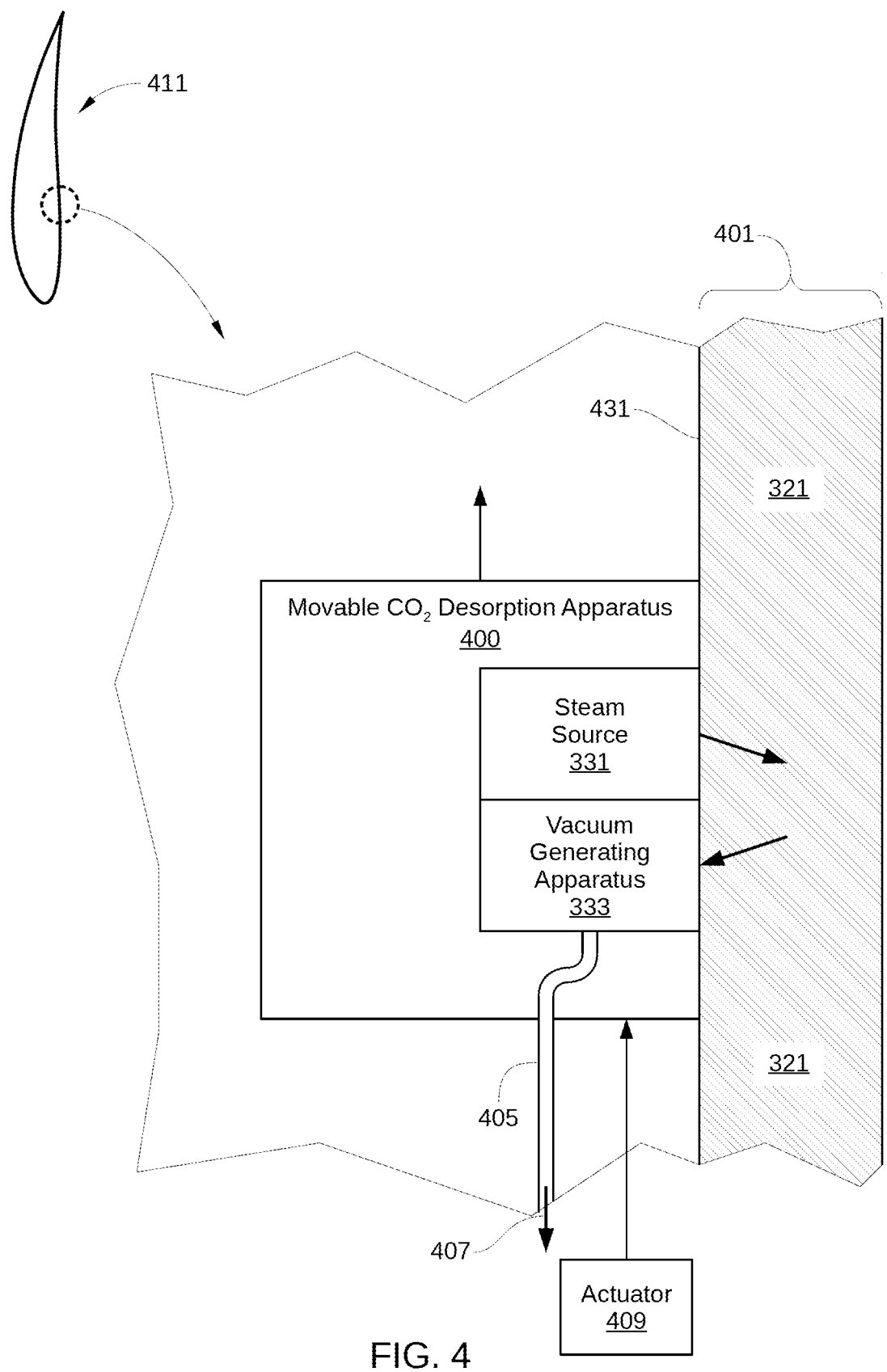
FIG. 4 is a more detailed illustration of the $CO_2$ desorption apparatus of FIG. 3, according to various embodiments.

FIG. 4 is a more detailed illustration of a movable CO2 desorption apparatus 400, according to various embodiments. Movable CO2 desorption apparatus 400 is disposed within a wind turbine blade 411 of a wind turbine and positioned against a surface 431 of a wall 401 of a wind turbine blade. As shown, wall 401 of blade 411 includes or is formed from amine-based CO2 adsorber 321, which removes CO2 from ambient air flowing over wind turbine blade 411. In operation, an actuator 409 moves movable CO2 desorption apparatus 400 along surface 431 so that different portions of wall 401 can undergo a desorption process. In the embodiment illustrated in FIG. 4, movable CO2 desorption apparatus 400 includes a steam source 331 and a vacuum-generating apparatus 333. As shown, steam source 331 directs steam against surface 431 and/or into amine-based CO2 adsorber 321, and vacuum-generating apparatus 333 captures CO2 407 released from amine-based CO2 adsorber 321. The captured CO2 407 is collected for sequestration or storage via a conduit 405 fluidly coupled to movable CO2 desorption apparatus 400.

In some embodiments, the desorption process is performed periodically, for example during wind turbine idle time. In other embodiments, the desorption process is performed continuously. In such embodiments, movable $CO_2$ desorption apparatus 400 may be moved continuously along surface 431 desorbing $CO_2$ from portions of amine-based $CO_2$ adsorber 321 and capturing the desorbed $CO_2$.

In some embodiments, $CO_2$ desorption apparatus 330 includes a stationary $CO_2$-desorption apparatus that can desorb $CO_2$ from amine-based $CO_2$ adsorber 321. One such embodiment is described below in conjunction with FIG. 5.

Figure 5:
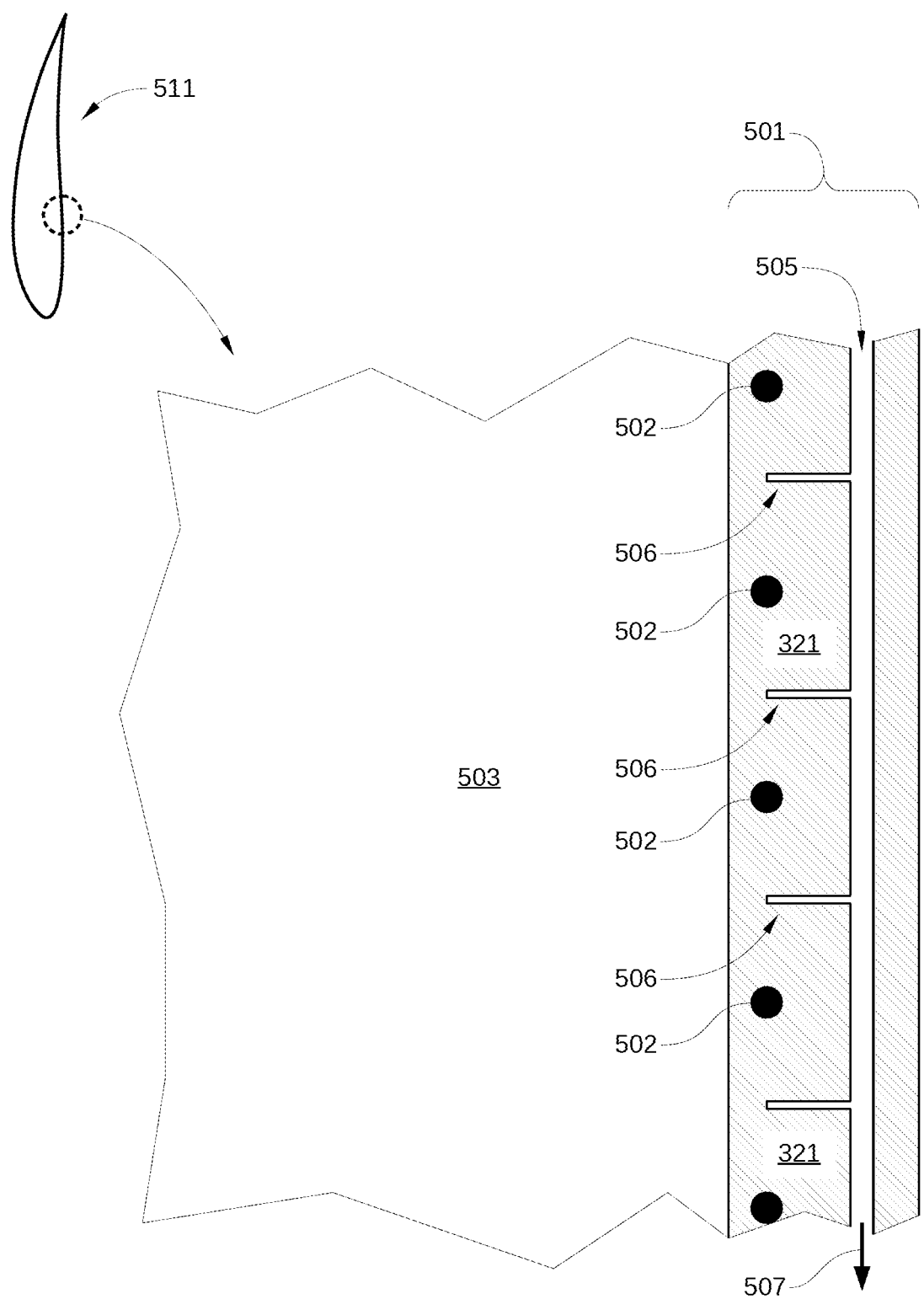
FIG. 5 is a more detailed illustration of the $CO_2$ desorption apparatus of FIG. 3, according to other various embodiments.

FIG. 5 is a more detailed illustration of a $CO_2$ desorption apparatus 500, according to other various embodiments. $CO_2$ desorption apparatus 500 is disposed within a wall 501 of a wind turbine blade 511 that includes or is formed by amine-based $CO_2$ adsorber 321. Specifically, a $CO_2$ desorption apparatus 500 includes one or more heat-generating elements 502 and one or more conduits 505 disposed within wall 501.

In some embodiments, the one or more conduits 505 include capillaries or other smaller channels for enhanced capture of desorbed $CO_2$. In some embodiments, conduits 505 are fluidly coupled to a vacuum-generating apparatus, such as vacuum-generating apparatus 333 in FIG. 3. Alternatively, in some embodiments, a vacuum-generating apparatus is fluidly coupled to an interior region 503 and desorbed $CO_2$ is transported from wind turbine blade 511 via interior region 503 instead of conduits 505.

In some embodiments, heat-generating elements 502 periodically perform a desorption process on amine-based $CO_2$ adsorber 321 by heating amine-based $CO_2$ adsorber 321 to a suitable desorption temperature. In some embodiments, the desorption temperature of $CO_2$ associated with amine-based $CO_2$ adsorber 321 is the temperature at which adsorbed $CO_2$ overcomes the activation barrier or the bounding energy that keeps the $CO_2$ adsorbed to a surface of amine-based $CO_2$ adsorber 321.

In sum, the various embodiments shown and provided herein set forth techniques for a low-energy direct air carbon capture process that is powered using electrical energy generated by a wind turbine. Specifically, the relative velocity between a flow of ambient air and a surface of a wind turbine blade causes air incident on openings formed in the surface to flow to a $CO_2$ desorption apparatus without the use of a fan or the expenditure of fan energy. Further, the $CO_2$ desorption apparatus is powered by electrical energy generated by the wind turbine.

At least one technical advantage of the disclosed design relative to the prior art is that the disclosed design enables direct air carbon capture that does not require an external energy source or a large, centralized source of renewable energy. In addition, the disclosed design enables a direct air carbon capture process that does not rely on a significant quantity of fan energy. Thus, the direct air carbon capture process requires less total energy expenditure and can be greenhouse gas net-negative. These technical advantages provide one or more technological advancements over prior art approaches.

1. In some embodiments, a direct-air carbon-capture system includes: a wind turbine that includes at least one blade that includes one or more openings, wherein, in operation, first air flows across the at least one blade, causing the wind turbine to generate electrical energy, and causing the one or more openings to receive second air; a conduit that fluidly couples the one or more openings to a carbon dioxide (CO2) adsorption chamber that includes one or more amine-based CO2 adsorbers, wherein, in operation, the CO2 adsorption absorption chamber receives the second air via the one or more openings; and a carbon desorption apparatus that desorbs CO2 from the one or more amine-based CO2 adsorbers.

2. The direct air carbon capture system of clause 1, wherein the conduit includes a rotary manifold disposed within a nacelle of the wind turbine.

3. The direct air carbon capture system of clauses 1 or 2, wherein the at least one blade comprises two or more blades, and the rotary manifold fluidly couples the two or more blades to the CO2 adsorption chamber.

4. The direct air carbon capture system of any of clauses 1-3, wherein the one or more openings are disposed on a surface of the at least one blade, wherein the surface fluidly contacts a high-pressure region that is generated when the first air flows across the at least one blade.

5. The direct air carbon capture system of any of clauses 1-4, wherein the surface comprises at least a portion of a leading edge of the at least one blade.

6. The direct air carbon capture system of any of clauses 1-5, wherein the surface comprises at least a portion of a trailing edge of the at least one blade.

7. The direct air carbon capture system of any of clauses 1-6, further comprising a valve for selectively closing the one or more openings.

8. The direct air carbon capture system of any of clauses 1-7, wherein the conduit has a first cross-sectional area proximate the one or more openings and a second cross-sectional area proximate the CO2 adsorption chamber, and wherein the first cross-sectional area is greater than the second cross-sectional area.

9. The direct air carbon capture system of any of clauses 1-8, wherein the conduit tapers continuously from the first cross-sectional area to the second cross-sectional area.

10. The direct air carbon capture system of any of clauses 1-9, wherein the carbon desorption apparatus is powered by the electrical energy generated by the wind turbine.

11. In some embodiments, a direct-air carbon-capture system includes: a wind turbine that includes at least one blade having a first surface that comprises an amine-based material, wherein, in operation, first air flows across the at least one blade, and the amine-based material adsorbs carbon dioxide (CO2) from the first air; and a CO2-desorption apparatus that is disposed within the at least one blade and desorbs the CO2 from the amine-based material.

12. The direct air carbon capture system of clause 11, wherein the amine-based material forms a portion of a wall of the at least one blade.

13. The direct air carbon capture system of clauses 11 or 12, further comprising an actuator that moves the $CO_2$-desorption apparatus along the portion of the wall.

14. The direct air carbon capture system of any of clauses 11-13, further comprising one or more conduits disposed within the wall that are fluidly coupled to a carbon sequestration system.

15. The direct air carbon capture system of any of clauses 11-14, further comprising a conduit that fluidly couples an output of the CO2-desorption apparatus to a carbon sequestration system.

16. The direct air carbon capture system of any of clauses 11-15, wherein the CO2-desorption apparatus comprises a movable CO2-desorption apparatus that desorbs $CO_2$ from a first portion of the amine-based material while the movable CO2-desorption apparatus is disposed proximate to the first portion.

17. The direct air carbon capture system of any of clauses 11-16, wherein, while disposed proximate to a second portion of the amine-based material, the movable $CO_2$-desorption apparatus desorbs CO2 from the second portion.

18. The direct air carbon capture system of any of clauses 11-17, further comprising an actuator that moves the movable $CO_2$-desorption apparatus from a first location proximate to the first portion to a second location proximate to a second portion of the amine-based material.

19. The direct air carbon capture system of any of clauses 11-18, wherein the $CO_2$-desorption apparatus is powered by electrical energy generated by the wind turbine.

20. The direct air carbon capture system of any of clauses 11-19, wherein the $CO_2$-desorption apparatus comprises one or more heat-generating elements disposed within the amine-based material.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

While the preceding is directed to embodiments of the present disclosure, other and further embodiments of the disclosure may be devised without departing from the basic scope thereof, and the scope thereof is determined by the claims that follow.

What is claimed is:

1. A direct-air carbon-capture system, comprising:
    a wind turbine that includes at least one blade that includes one or more openings, wherein, in operation, first air flows across the at least one blade, causing the wind turbine to generate electrical energy, and causing the one or more openings to receive second air;
    a conduit that fluidly couples the one or more openings to a carbon dioxide ($CO_2$) adsorption chamber that includes one or more amine-based $CO_2$ adsorbers, wherein, in operation, the $CO_2$ adsorption chamber receives the second air via the one or more openings; and
    a carbon desorption apparatus that desorbs $CO_2$ from the one or more amine-based $CO_2$ adsorbers.

2. The direct air carbon capture system of claim 1, wherein the conduit includes a rotary manifold disposed within a nacelle of the wind turbine.

3. The direct air carbon capture system of claim 2, wherein the at least one blade comprises two or more blades, and a rotary union fluidly couples the two or more blades to the $CO_2$ adsorption chamber.

4. The direct air carbon capture system of claim 1, wherein the one or more openings are disposed on a surface of the at least one blade, wherein the surface fluidly contacts a high-pressure region that is generated when the first air flows across the at least one blade.

5. The direct air carbon capture system of claim 4, wherein the surface comprises at least a portion of a leading edge of the at least one blade.

6. The direct air carbon capture system of claim 4, wherein the surface comprises at least a portion of a trailing edge of the at least one blade.

7. The direct air carbon capture system of claim 1, further comprising a valve for selectively closing the one or more openings.

8. The direct air carbon capture system of claim 1, wherein the conduit has a first cross-sectional area proximate the one or more openings and a second cross-sectional area proximate the $CO_2$ adsorption chamber, and wherein the first cross-sectional area is greater than the second cross-sectional area.

9. The direct air carbon capture system of claim 8, wherein the conduit tapers continuously from the first cross-sectional area to the second cross-sectional area.

10. The direct air carbon capture system of claim 1, wherein the carbon desorption apparatus is powered by the electrical energy generated by the wind turbine.

11. A direct-air carbon-capture system, comprising:
    a wind turbine that includes at least one blade having a first surface that comprises an amine-based material, wherein, in operation, first air flows across the at least one blade, and the amine-based material adsorbs carbon dioxide ($CO_2$) from the first air; and
    a $CO_2$-desorption apparatus that is disposed within the at least one blade and desorbs the $CO_2$ from the amine-based material.

12. The direct air carbon capture system of claim 11, wherein the amine-based material forms a portion of a wall of the at least one blade.

13. The direct air carbon capture system of claim 12, further comprising an actuator that moves the $CO_2$-desorption apparatus along the portion of the wall.

14. The direct air carbon capture system of claim 12, further comprising one or more conduits disposed within the wall that are fluidly coupled to a carbon sequestration system.

15. The direct air carbon capture system of claim 11, further comprising a conduit that fluidly couples an output of the $CO_2$-desorption apparatus to a carbon sequestration system.

16. The direct air carbon capture system of claim 11, wherein the $CO_2$-desorption apparatus comprises a movable $CO_2$-desorption apparatus that desorbs $CO_2$ from a first portion of the amine-based material while the movable $CO_2$-desorption apparatus is disposed proximate to the first portion.

17. The direct air carbon capture system of claim 16, wherein, while disposed proximate to a second portion of the amine-based material, the movable $CO_2$-desorption apparatus desorbs $CO_2$ from the second portion.

18. The direct air carbon capture system of claim 16, further comprising an actuator that moves the movable $CO_2$-desorption apparatus from a first location proximate to the first portion to a second location proximate to a second portion of the amine-based material.

19. The direct air carbon capture system of claim 11, wherein the $CO_2$-desorption apparatus is powered by electrical energy generated by the wind turbine.

20. The direct air carbon capture system of claim 11, wherein the $CO_2$-desorption apparatus comprises one or more heat-generating elements disposed within the amine-based material.

* * * * *